United States Patent

[11] 3,586,881

[72] Inventor Wilmer B. Gaunt, Jr.
Boxford, Mass.
[21] Appl. No. 694,464
[22] Filed Dec. 29, 1967
[45] Patented June 22, 1971
[73] Assignee Bell Telephone Laboratories, Incorporated
Murray Hill, N.J.

[54] TRANSISTOR HYBRID CIRCUIT
5 Claims, 2 Drawing Figs.

[52] U.S. Cl. .......... 307/241,
307/249, 307/253, 179/170
[51] Int. Cl. .......... H04b 3/38
[50] Field of Search .......... 179/170 T,
170; 333/11, 7; 328/154; 307/242, 241, 243, 249, 253

[56] References Cited

UNITED STATES PATENTS

| | | | |
|---|---|---|---|
| 2,499,423 | 3/1950 | Selinger | 179/170 NHC |
| 3,453,395 | 7/1969 | Englund | 179/170 |
| 2,655,557 | 10/1953 | Stanbury | 179/170 |
| 3,480,742 | 11/1969 | Gaunt | 179/170 |

FOREIGN PATENTS

| | | | |
|---|---|---|---|
| 1,124,351 | 8/1968 | Great Britain | 179/170 |

*Primary Examiner*—Donald D. Forrer
*Assistant Examiner*—Harold A. Dixon
*Attorneys*—R. J. Guenther and James Warren Falk

ABSTRACT: A transistor hybrid circuit for exchanging signals between the incoming and outgoing paths of a four-wire line and a two-wire line is described. A signal from the incoming path is coupled via an amplifier and the base-emitter path of a coupling transistor to the two-wire line. An outgoing signal from the two-wire line is coupled via the emitter-collector path of the coupling transistor and a second amplifier to the outgoing path. A resistor network connected to the coupling transistor prevents the signal from the incoming path from being applied to the outgoing path.

INVENTOR
W. B. GAUNT, JR.
BY J S Cubert
ATTORNEY

TRANSISTOR HYBRID CIRCUIT

BACKGROUND OF THE INVENTION

This invention relates to transmission systems and, more particularly, to hybrid arrangements for establishing signal transmission between pairs of one-way transmission paths and bidirectional transmission paths.

In communication and related systems, combinations of four-wire transmission lines and two-wire transmission lines are often utilized to provide efficient and economical transmission of signals. A four-wire line generally comprises an incoming one-way transmission path and an outgoing one-way transmission path, while a two-wire transmission line is a bidirectional transmission path. A hybrid circuit is required at each junction between a four-wire line and a two-wire line to couple incoming signals from the incoming path to the bidirectional path and to couple outgoing signals from the bidirectional path to the outgoing path. Apparatus is included in the hybrid circuit to prevent unwanted coupling of incoming signals to the associated outgoing path. This unwanted coupling may cause undesirable regeneration and oscillations which substantially interfere with signal transmission.

Hybrids employing special transformers and balancing circuits have customarily been used in the aforementioned transmission arrangements. But such transformers and balancing circuits have been difficult to design and to fabricate. More efficient and more economical electronic circuits have been developed to provide hybrid coupling between four-wire and two-wire transmission lines. One type of electronic hybrid circuit known in the art uses a first amplifier to transmit signals from the incoming path of a four-wire line to a bidirectional two-wire line and a second amplifier to transmit signals from the bidirectional line to the outgoing path of the four-wire line. The output of the outgoing path amplifier contains both an amplified outgoing signal which originates on the bidirectional line and a signal from the bidirectional line corresponding to the incoming path signal. In order to prevent the incoming path signal on the bidirectional line from reaching the outgoing line, a third amplifier is connected between the incoming and outgoing path. By arranging the phase relationship between the incoming path signal appearing at the output of the outgoing amplifier and the incoming path signal at the output of the third amplifier so that these two signals cancel, only the outgoing signal is permitted to reach the outgoing path. Changes of conditions on the outgoing path, however, may interfere with the hybrid action and differences in the gains, delays and output impedances between the second and third amplifiers connected to the outgoing path can result in unwanted phase differences between the signals to be cancelled so that a portion of the incoming path signal may remain uncancelled and appear on the outgoing path.

In a second type of hybrid circuit, as disclosed, for example, in my copending application, Ser. No. 627,499, filed Mar. 31, 1967, the signals from the bidirectional line which are to be cancelled are coupled through a single active device isolated from the outgoing path so that the adverse effects of unbalanced characteristics of a plurality of active devices and the adverse effects of variations of conditions on the outgoing path are avoided. In this type of hybrid circuit, however, it is necessary to accurately adjust the values of a plurality of impedances associated with the single active device in order that satisfactory cancellation be achieved.

BRIEF SUMMARY OF THE INVENTION

This invention is a hybrid circuit utilizing an electronic device for coupling signals between an incoming and an outgoing path and a bidirectional path which device blocks the incoming path signal from the associated outgoing path by cancelling that portion of the signal from the bidirectional path corresponding to the incoming signal in an impedance connected between an incoming path amplifier and the output terminal of the electronic device.

In a preferred embodiment of this invention, signals from the incoming path are coupled via an incoming amplifier and a voltage divider to the base of a transistor. The voltage divider is connected between the outputs of the incoming amplifier and an outgoing amplifier which is connected between the transistor collector and the outgoing path. Incoming signals from the incoming amplifier are directly coupled, in accordance with my invention, to the collector of the transistor through an impedance and are applied to the bidirectional line via the voltage divider and the base-emitter path of the transistor. Outgoing signals from the bidirectional line are applied to the outgoing path via the emitter-collector path of the transistor and the outgoing amplifier. The incoming signals appearing on the bidirectional line are also transmitted to the transistor collector. These incoming signals, however, are cancelled by the incoming path signal coupled via the incoming amplifier to the impedance connected to the transistor collector. The impedance of the hybrid circuit at the transistor emitter may be matched to that of the bidirectional line by selecting the value of the impedance connected between the incoming amplifier and the transistor collector.

Accordingly, it is a feature of my invention that an impedance be connected directly between the output of the incoming path amplifier and the output of the transistor which is the bidirectional line coupling amplifier to provide the cancellation of the incoming path signal from the outgoing path, the output from the incoming path amplifier being connected to the bidirectional line coupling amplifier by another circuit path other than this impedance.

It is another feature of my invention that a voltage divider be connected between the incoming path coupling amplifier output and the outgoing path directly and that the input to the bidirectional line coupling amplifier be taken from this voltage divider.

DETAILED DESCRIPTION

Figure 1:
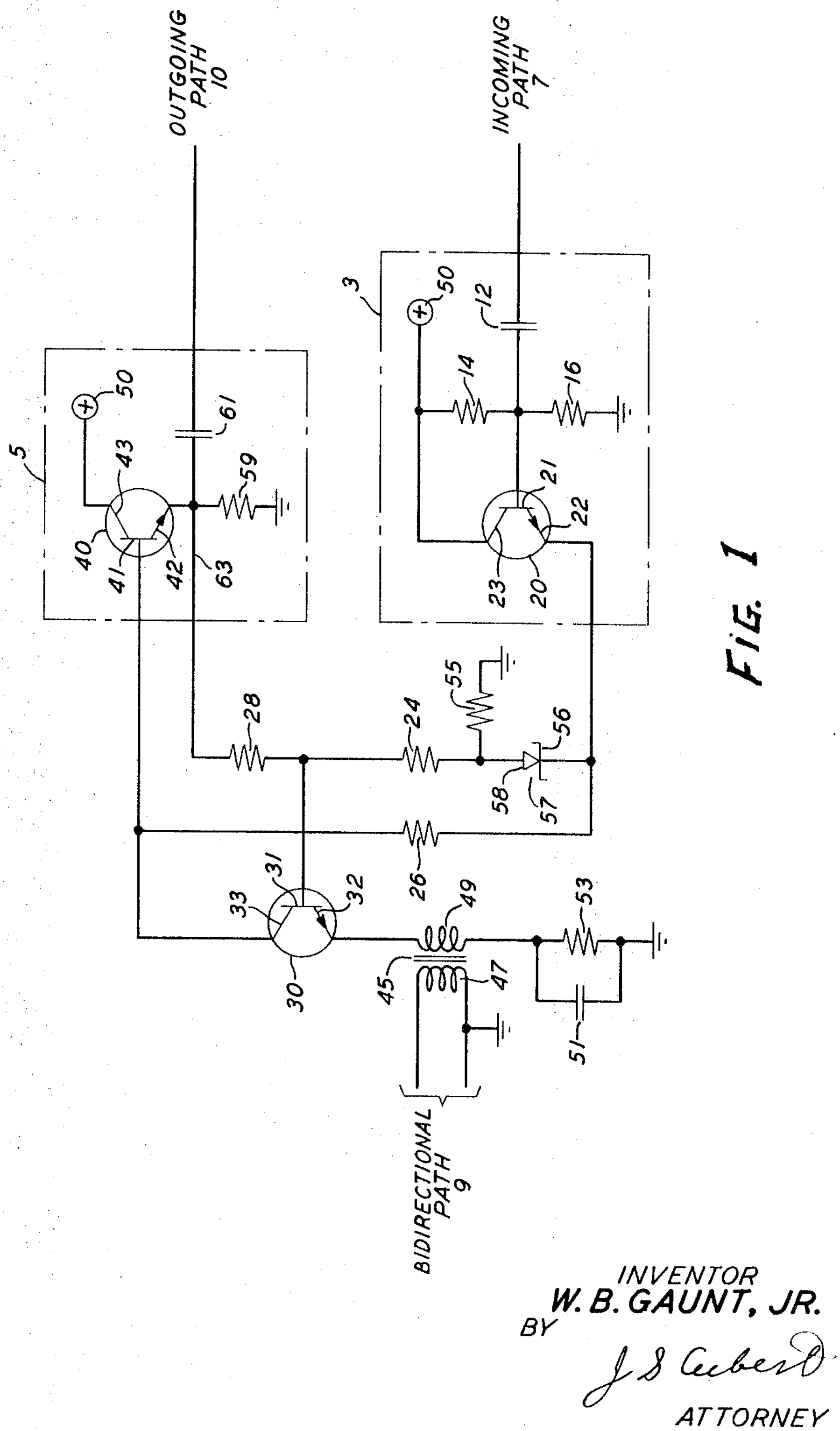
FIG. 1 shows an illustrative embodiment of this invention.

Referring to the figure, incoming path 7 of a four-wire line is connected to the input of incoming amplifier 3. A signal is applied to incoming path 7 and coupled through amplifier 3 to the voltage divider network comprising impedances 24 and 28. This voltage divider network acts as an attenuater for the incoming signal. One terminal of impedance 24 is connected to the output of amplifier 3 via Zener diode 57 and the other terminal of impedance 24 is connected to base 31 of NPN transistor 30. Impedance 28 is connected between base 31 and output lead 63 of outgoing amplifier 5 which output lead is capacitively coupled to outgoing path 10. Because of the voltage divider action of series connected impedances 24 and 28, only a portion of the incoming signal from amplifier 3 is applied to base 31. This signal portion is coupled to bidirectional path 9 via the base-emitter path of transistor 30, emitter 32 and 1:1 transformer 45. Resistor 53 connected between winding 49 and a ground reference provides bias current for emitter 32 so that transistor 30 operates in its linear mode. Capacitor 51 connected across resistor 53 shunts signal current from winding 49 to the ground reference so that the signal voltage at emitter 32 appears only across winding 49.

An outgoing signal from bidirectional path 9 is applied to emitter 32 through transformer 45 and is coupled via the emitter-collector path of transistor 30 to collector 33. The outgoing signal at collector 33 appears across impedance 26 which is connected between collector 33 and the output of amplifier 3. This outgoing signal is applied to outgoing path 10 through amplifier 5. The portion of the incoming signal appearing on bidirectional path 9 is also coupled through the emitter-collector path of transistor 30 to collector 33. The path 9 signal current flowing into collector 33 flows through impedance 26. This is so because the input impedance amplifier 5 is very high. The incoming path signal appearing on the output of amplifier 3 is also applied to impedance 26. This impedance may be adjusted in accordance with my invention so that the signal voltage across it resulting from the bidirectional path 9 signal current flowing into collector 33 is cancelled by the incoming signal voltage at the output of amplifier 3. Therefore, the resultant incoming path signal appearing at the input of amplifier 5 is zero. In this manner, incoming path signals are coupled from incoming path 7 to bidirectional path 9 and are blocked from outgoing path 10. The outgoing signal transmission from bidirectional path 9 to outgoing path 10 is unaffected by the cancellation arrangement. Thus, a single impedance connected between the output of incoming amplifier 3 and collector 33 is effective to block incoming signals from the outgoing path.

Amplifier 3 comprises transistor 20, base biasing resistors 14 and 16, and capacitor 12. Capacitor 12 couples signals appearing on incoming path 7 to base 21 of transistor 20 but prevents DC bias voltage to collector 23 and to series connected resistors 14 and 16. These resistors are arranged to provide base bias current to base 21 so that transistor 20 operates in its linear region. The values of these resistors may be selected to match the impedance of incoming path 7.

Emitter 22 is connected to ground through Zener diode 57 and resistor 55, and one terminal of impedance 24 is connected to the junction of diode 57 and resistor 55. This arrangement completes the emitter biasing path. As is well known in the art, there is a constant DC voltage across Zener diode 57 in response to the DC current passing through it provided that this DC current exceeds a threshold value. Since Zener diode 57 exhibits a very low impedance at signal frequencies when the threshold value is exceeded, the signal voltage at cathode 58 is substantially the same as the signal voltage at anode 56.

Emitter 22 is directly coupled to collector 33 through impedance 26 so that a DC bias voltage is applied to collector 33. The bias current network for base 31 includes diode 57 and impedance 24, 28 and 59. It is to be understood that other coupling arrangements such as resistor-capacitor networks may be utilized in place of Zener diode 57 and resistor 55. NPN transistor 20 operates as an emitter follower. As well known in the art, this circuit has substantially unity gain and signals are coupled through it without inversion. The output impedance of emitter-follower amplifier 3 is very low and is substantially zero if the gain of the transistor is sufficiently high.

Amplifier 5 comprises NPN transistor 40, resistor 59 and capacitor 61. Positive voltage source 50 supplies an appropriate DC bias voltage to collector 43 and bias current is applied to base 41 from emitter 22 through resistor 26. A return path for DC emitter current is provided through resistor 59. The collector voltage and base and emitter bias currents are arranged so that transistor 40 operates in its linear mode. Capacitor 61, connected between emitter 42 and outgoing path 10, prevents any DC bias voltage at emitter 42 from being applied to outgoing path 10 but allows outgoing signals to be transmitted to outgoing path 10. Since collector 43 is connected directly to a positive voltage source, the output from transistor 40 appears on emitter 42. This transistor is also connected as an emitter follower. Thus, as is well known in the art, the signal appearing at emitter 42 is substantially the same as the signal voltage at base 41 and there is no signal inversion. While both amplifiers 3 and 5 are shown as emitter-follower amplifiers in the figure, it is to be understood that other amplifier circuits may be used in embodiments of this invention and that PNP transistors or combinations of NPN and PNP transistors may be utilized in place of the NPN transistors of the figure.

Figure 2:
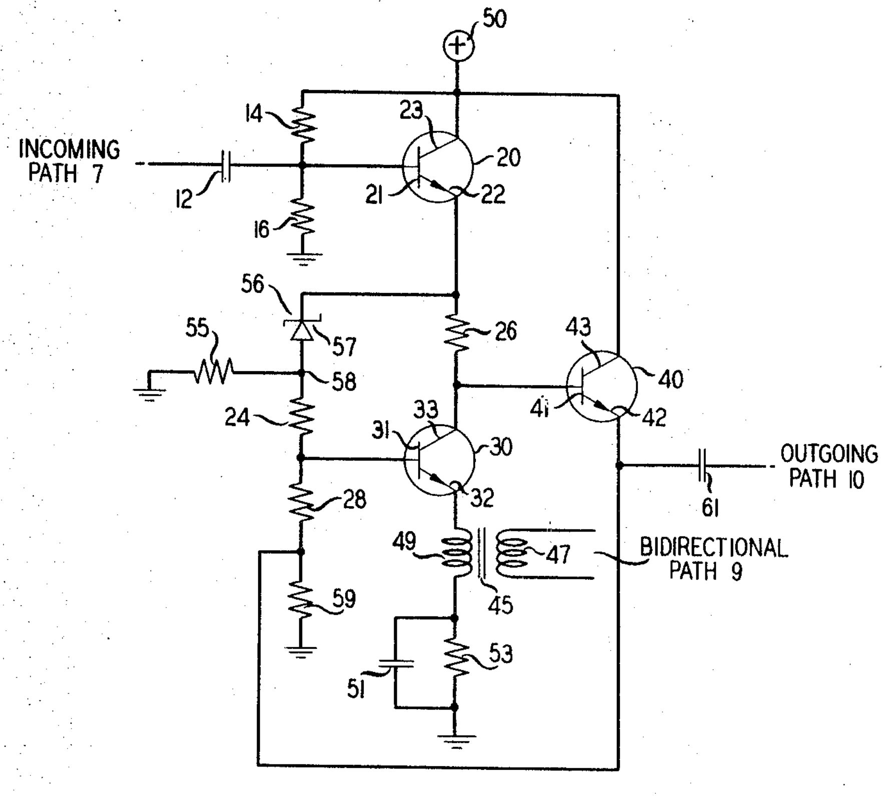
FIG. 2 shows the circuit of FIG. 1 rearranged to illustrate the DC biasing scheme.

FIG. 2 shows the circuit of FIG. 1 redrawn to illustrate the DC biasing arrangements for the semiconductor devices therein. As aforementioned and referring to FIG. 2, DC current flows from positive source 50 through the collector-emitter path of transistor 20 in accordance with the biasing potential on base 21 provided by resistors 14 and 16. The DC current from emitter 22 then flows through one path including impedance 26, the collector-emitter path of transistor 30, transformer winding 49, and resistor 53 to a ground reference. This path provides collector and emitter biasing for transistor 30. A second path from emitter 22 through Zener diode 57, impedances 24, 28 and 59 provides DC biasing for base 31 of transistor 30. A third path from terminal 58 of diode 57 through resistor 55 insures that Zener diode 57 conducts at its threshold voltage. A fourth path through impedance 26, the base-emitter diode of transistor 40, and impedance 59 provides biasing for transistor 40 together with positive source 50, which source is connected to collector 43. In this way appropriate DC operating voltages are obtained for the semiconductor devices of the circuit including series-connected transistors 20 and 30. It should be noted that the signal voltage from path 7 is coupled to emitter 22 via the base-emitter path of transistor 20 and that this coupled signal voltage is superimposed on the DC bias voltage that appears on emitter 22.

The following illustrates how the voltage divider including impedances 24 and 28, and impedance 26, operate in conjunction with transistor 30 to block the incoming signal from the outgoing path according to my invention. For purposes of illustration, it is assumed that impedances 24 and 28 are equal and that impedance 26, is twice $Z_{01}$, the characteristic impedance of bidirectional path 9. It is to be understood that other values of impedances may be used. It is further assumed that a signal voltage $v_s$ is applied to amplifier 3 from incoming path 7. As hereinbefore described, the gain of amplifier 3 is substantially unity so that the signal voltage $v_s$ also appears at emitter 22 and is coupled without attenuation through Zener diode 57 to impedance 24. In response to the signal voltage $v_s$, a voltage $v_s/2$ appears at base 31. This is so because impedances 24 and 28 are equal and the impedance at signal frequencies between emitter 42 and the ground reference is substantially zero.

In accordance with the well-known principals of transistor operation, the signal voltage at emitter 32 is substantially equal to the signal voltage at base 31, i.e., $v_s/2$. This voltage is impressed across winding 49 of transformer 45. Substantially, no signal voltage appears across resistor 53 because the impedance of capacitor 51 at signal voltage frequencies is very low. The signal voltage $v_s/2$ is magnetically coupled from winding 49 to winding 47 and is applied to bidirectional path 9. In response to the signal current in emitter 32, a signal current of equal magnitude flows through impedance 26 into collector 33. The impedance at winding 49, due to bidirectional path 9, is substantially the characteristic impedance of the bidirectional path ($Z_0$) so that the emitter signal current, $i_1$, is $v_s/2Z_0$. Thus, the voltage across impedance 26 is $2i_1Z_0$, and the voltage drop across impedance 26 is $v_s$. But the voltage on the lead connecting emitter 22 to impedance 26 is also $v_s$. Therefore, the signal voltage at collector 33 and base 41 resulting from the input signal voltage $v_s$ is zero. In this way, the incoming path voltage is blocked from outgoing path 10.

The circuit of the figure operates to transit signals from bidirectional path 9 to outgoing path 10 in the following manner. A signal voltage $v_o$ applied to bidirectional path 9 causes a signal voltage, assume this signal voltage is $v_2$, to appear on the lead connecting collector 33 to base 41. The voltage $u_2$ is coupled through the base-emitter path of transistor 40 and is applied to emitter 42. Since impedance 28 is equal to impedance 24 and the output impedance of amplifier 3 at emitter 22 is substantially zero, the signal voltage $v_2/2$ is fed back to base 31 and this voltage is coupled to emitter 32. Series connected impedances 24 and 28 are effective to attenuate the signal appearing on outgoing path 10. The signal current flowing into collector 33 is $v_2/2Z_0$ because of impedance 26 and this signal current flows into emitter 32. The impedance at emitter 32, the ratio of the voltage to the current at that point, is $(v_2/2/(v_2/2Z_0)$ and is equal to $Z_0$. The impedance terminating bidirectional path 9 is then equal to the characteristic impedance of the path so that the impedance of the hybrid circuit is matched to the bidirectional path at the junction between the two. Because of the matched conditions, $v_o$ is twice the voltage, $v_2/2$ at emitter 32. Therefore, the signal voltage, $v_o$, applied to the bidirectional path is equal to the outgoing signal voltage applied to the outgoing path, $v_2$. The hybrid circuit of the figure advantageously couples all of the outgoing signal to the outgoing path and provides an impedance match which prevents reflections from occurring at the junction of the hybrid circuit with the bidirectional path.

The principles of this invention have been described with reference to a particular embodiment. Numerous other arrangements and variations may be devised by those skilled in the art without departing from the spirit and scope of the invention.

What I claim is:

1. A hybrid circuit for establishing signal transmission between the incoming and the outgoing paths of a four-wire line and a bidirectional two-wire line comprising first, second and third semiconductor devices each having first, second and control electrodes, an energy source, said first electrodes of said first and third devices being connected to said energy source, means for coupling said incoming path to the control electrode of said first device, means for coupling the second electrode of said third device to said outgoing path, mans for coupling said bidirectional two-wire line to the second electrode of said second device, a network connected between the second electrode of said first device, and the second electrode of said third device and to the control electrode of said second device, the first electrode of said second device being connected to the control electrode of said third device, and impedance means connected between the second electrode of said first device and the first electrode of said second device for serially connecting said first and second devices.

2. A hybrid circuit for establishing signal transmission between an incoming path, an outgoing path and a bidirectional path comprising an incoming path coupling transistor, a bidirectional path coupling transistor, and an outgoing path coupling transistor, each transistor having a base, a collector and an emitter, a voltage source, the collectors of said incoming path coupling transistor and said outgoing path coupling transistor being connected to said voltage source, means for connecting said incoming path to the base of said incoming path coupling transistor, means for connecting the emitter of said outgoing path coupling transistor to said outgoing path, means for connecting said bidirectional path to the emitter of said bidirectional path coupling transistor, an impedance network directly connected between the emitter of said incoming path coupling transistor and the emitter of said outgoing path coupling transistor and to the base of said bidirectional path coupling transistor, the collector of said bidirectional path coupling transistor being directly connected to the base of said outgoing path coupling transistor, and impedance means connected between the emitter of said incoming path coupling transistor and the collector of said bidirectional path coupling transistor for serially connecting said incoming path and said bidirectional path coupling transistors.

3. A hybrid circuit according to claim 2 wherein each of said incoming path, bidirectional path and outgoing path transistors is an NPN transistor.

4. A hybrid circuit according to claim 2 wherein said impedance network comprises a voltage divider including a Zener diode having an anode and a cathode, said Zener diode cathode being connected to the emitter of said incoming path coupling transistor, a first impedance connected between said Zener diode anode and the base of said bidirectional path coupling transistor and a second impedance connected between the base of said bidirectional path coupling transistor, and the emitter of said outgoing path coupling transistor, and said impedance means connected between the emitter of said incoming path coupling transistor and the collector of said bidirectional path coupling transistor comprises a third impedance connected between the emitter of said incoming path coupling transistor and the collector of said bidirectional path coupling transistor.

5. A hybrid circuit according to claim 4 wherein said bidirectional path has a characteristic impedance, said third impedance is equal to twice said characteristic impedance, and said first impedance is equal to said second impedance.